(12) United States Patent
Rydén et al.

(10) Patent No.: US 11,567,159 B2
(45) Date of Patent: Jan. 31, 2023

(54) NARROWBAND POSITIONING REFERENCE SIGNAL GENERATION FOR CORRELATION PROPERTIES

(71) Applicant: TELEFONAKTIEBOLAGET LM ERICSSON (PUBL), Stockholm (SE)

(72) Inventors: Henrik Rydén, Solna (SE); Sara Modarres Razavi, Linköping (SE); Iana Siomina, Täby (SE); Johannes Nygren, Uppsala (SE); Yutao Sui, Solna (SE)

(73) Assignee: TELEFONAKTIEBOLAGET LM ERICSSON (PUBL), Stockholm (SE)

(\*) Notice: Subject to any disclaimer, the term of this patent is extended or adjusted under 35 U.S.C. 154(b) by 171 days.

(21) Appl. No.: 17/045,580

(22) PCT Filed: Apr. 5, 2019

(86) PCT No.: PCT/IB2019/052836
§ 371 (c)(1),
(2) Date: Oct. 6, 2020

(87) PCT Pub. No.: WO2019/193577
PCT Pub. Date: Oct. 10, 2019

(65) Prior Publication Data
US 2021/0025960 A1 Jan. 28, 2021

Related U.S. Application Data

(60) Provisional application No. 62/654,013, filed on Apr. 6, 2018.

(51) Int. Cl.
*G01S 1/04* (2006.01)
*H04L 5/00* (2006.01)
(Continued)

(52) U.S. Cl.
CPC .......... *G01S 1/0428* (2019.08); *H04L 5/0048* (2013.01); *H04L 5/0069* (2013.01); *H04W 24/08* (2013.01); *H04W 64/003* (2013.01)

(58) Field of Classification Search
CPC ... G01S 1/0428; G01S 5/0226; H04L 5/0048; H04L 5/0069; H04L 5/0041;
(Continued)

(56) References Cited

U.S. PATENT DOCUMENTS

2012/0051445 A1\* 3/2012 Frank .................... H04L 5/0048
375/259
2013/0336259 A1\* 12/2013 Awad .................... H04L 5/0007
370/329
(Continued)

FOREIGN PATENT DOCUMENTS

AU 2014283378 B2 \* 9/2018 ................ A61P 1/02
CN 102640428 A 8/2012
(Continued)

OTHER PUBLICATIONS

ITL, "Support of OTDOA in NB-IoT", 3GPP TSG RAN WG1 Meeting #86, R1-167752, Gothenburg, Sweden, Aug. 22-26, 2016. (Year: 2016).\*
(Continued)

*Primary Examiner* — Ayaz R Sheikh
*Assistant Examiner* — Louis Samara

(57) ABSTRACT

Systems and methods for configuring and generating Narrowband Positioning Reference Signals (NPRS) for NB-IoT are provided. A network node provides (NPRS) configuration information indicating a system frame number (SFN) dependent resource mapping. A wireless device obtains a NPRS in accordance with the indicated SFN dependent resource mapping and uses it to perform a radio measurement operation.

34 Claims, 12 Drawing Sheets

(51) Int. Cl.
*H04W 24/08* (2009.01)
*H04W 64/00* (2009.01)

(58) Field of Classification Search
CPC ... H04W 24/08; H04W 64/003; H04W 64/00; H04W 72/085; H04W 24/10; H04W 72/0453; H04W 56/00; H04W 4/80; H04B 7/0421
See application file for complete search history.

(56) References Cited

U.S. PATENT DOCUMENTS

| | | | | |
|---|---|---|---|---|
| 2015/0296475 | A1* | 10/2015 | Burroughs | H04W 56/00 455/456.1 |
| 2017/0289831 | A1* | 10/2017 | Park | G01S 5/0236 |
| 2018/0097596 | A1 | 4/2018 | Palanivelu | |
| 2018/0217228 | A1* | 8/2018 | Edge | H04W 64/00 |
| 2019/0245663 | A1* | 8/2019 | Kim | H04L 27/2663 |
| 2019/0265326 | A1* | 8/2019 | Lin | G01S 5/0226 |
| 2020/0259617 | A1* | 8/2020 | Ko | H04W 4/80 |
| 2020/0374075 | A1* | 11/2020 | Luo | H04W 72/0453 |
| 2021/0127288 | A1* | 4/2021 | Manolakos | H04B 7/0421 |

FOREIGN PATENT DOCUMENTS

| | | | | |
|---|---|---|---|---|
| CN | 110192117 B | * | 11/2021 | G01S 1/20 |
| TW | 201742503 A | | 12/2017 | |
| WO | WO-2018093320 A1 | * | 5/2018 | G01S 1/20 |

OTHER PUBLICATIONS

Ericsson, "On NPRS performance", 3GPP TSG-RAN WG1#92bis, R1-1804167, Sanya, China, Apr. 16-20, 2018.
Ericsson, "On NR coexistence with LTE-MTC and NB-IoT", 3GPP TSG-RAN WG1 Meeting #90, R1-1714447, Prague, Czech Republic, Aug. 21-25, 2017.
Huawei et al., Design of downlink positioning reference signal for NB-IoT, 3GPP TSG RAN WG1 Meeting #87, R1-1611143, Reno, USA, Nov. 14-18, 2016.
Huawei, Hisilicon, "On NPRS for OTDOA", 3GPP TSG RAN WG1 Meeting #92, R1-1801885, Athens, Greece, Feb. 26-Mar. 2, 2018.
ITL, "Support of OTDOA in NB-IoT", 3GPP TSG RAN WG1 Meeting #86, R1-167752, Gothenburg, Sweden, Aug. 22-26, 2016.
Qualcomm Inc. (Rapporteur), Report of email discussion [96#53][LTE/eNB-IoT] Positioning LPP, 3GPP TSG-RAN WG2 Meeting #97, R2-1701108, Athens, Greece, Feb. 13-17, 2017.
Qualcomm Incorporated, "NPRS enhancement", 3GPP TSG RAN WG1 Meeting #93, R1-1807094, Busan, Korea, May 21-25, 2018.
Qualcomm Incorporated, "On NPRS performance", 3GPP TSG RAN WG1 Meeting #92 R1-1802300, Athens, Greece, Feb. 26-Mar. 2, 2018.
ISR and Written Opinion from corresponding application PCT/IB2019/052836.

* cited by examiner

NARROWBAND POSITIONING REFERENCE SIGNAL GENERATION FOR CORRELATION PROPERTIES

CROSS REFERENCE TO RELATED APPLICATIONS

This application claims the benefit of U.S. Provisional Application No. 62/654,013 filed on Apr. 6, 2018, the entire contents of which are hereby incorporated by reference.

TECHNICAL FIELD

The present disclosure generally relates to wireless communications and wireless communication networks.

INTRODUCTION

The Internet of Things (IoT) is a vision for the future world where everything that can benefit from a connection will be connected. Cellular technologies are being developed or evolved to play a role in the IoT world, particularly the machine type communication (MTC). MTC is characterized by lower demands on data rates than, for example, mobile broadband, but with higher requirements on low cost device design, better coverage, and ability to operate for years on batteries without charging or replacing the batteries, etc. To meet the IoT design objectives, standardization bodies such as Third Generation Partnership Project (3GPP) have standardized Narrowband IoT (NB-IoT) in Release 13 to include a system bandwidth of 180 kHz and target improved coverage, long battery life, low complexity communication design, and network capacity that is sufficient for supporting a massive number of devices.

To further increase the impact of NB-IoT, improving narrowband support for positioning is an aspect of NB-IoT in Release 14. The enhancement will be designed to maintain the ultra-low cost and complexity of the Release 13 NB-IoT UE where appropriate, as well as the coverage and capacity of the NB-IoT network.

Location-based services and emergency call positioning drive the development of positioning in wireless networks. Positioning support in 3GPP Long Term Evolution (LTE) was introduced in Release 9. This enables operators to retrieve position information for location-based services and to meet regulatory emergency call positioning requirements.

Positioning in LTE is supported by the architecture in FIG. 1, with interactions between a wireless device (UE 110) and a location server, such as an Evolved Serving Mobile Location Center (E-SMLC) 130, is via the LTE Positioning Protocol (LPP). Moreover, there are also interactions between the location server 130 and the radio access node (eNodeB 120) via the LPPa protocol, to some extent supported by interactions between the eNodeB 120 and the wireless device 110 via the Radio Resource Control (RRC) protocol. The interfaces between Mobility Management Entity (MME) 132 and Gateway Mobile Location Centre (GMLC) 134 network nodes are also illustrated in FIG. 1.

The following positioning techniques are considered in LTE:

Enhanced Cell ID. Cell ID information to associate the UE to the serving area of a serving cell, and then additional information to determine a finer granularity position.

Assisted GNSS (Global Navigation Satellite Systems). GNSS information retrieved by the UE, supported by assistance information provided to the UE from E-SMLC OTDOA (Observed Time Difference of Arrival). The UE estimates the time difference of reference signals from different base stations and sends to the E-SMLC for multilateration.

UTDOA (Uplink TDOA). The UE is requested to transmit a specific waveform that is detected by multiple location measurement units (e.g. an eNB) at known positions. These measurements are forwarded to E-SMLC for multilateration In LTE, the basic concept of OTDOA is that a location/positioning server, e.g. an E-SMLC, requests the position of a UE which triggers the UE to estimate time of arrival (TOA) of signals received from multiple radio access nodes, such as eNBs. The TOAs from several neighboring eNBs are subtracted from a TOA from a reference eNB to form Observed Time Difference of Arrivals that the UE reports to the network. These measurements are known as Reference Signal Time Difference (RSTD) measurements. Based on the reported RSTD measurements and known positions of the involved eNBs, the positioning server can estimate the position of the UE by using multilateration techniques.

FIG. 2 illustrates an example of OTDOA position estimation based on multilateration of the RSTD measurements. OTDOA in LTE is based on the UE measuring the time of arrival (TOA) of signals received from eNBs 120A-120C. The UE measures the relative difference between the reference cell and another specific cell, defined as reference signal time difference (RSTD) measurement. Every such RSTD measurement determines a hyperbola, and the intersected point of these hyperbolas can be estimated as the UE position. Here, the reference cell can be selected by the UE or indicated by the positioning in the OTDOA assistance data. The RSTD measurement of a cell with respect to a reference cell can be an intra-frequency measurement (e.g. reference cell and the measured cell are on the same carrier frequency as the serving cell) or an inter-frequency measurement (e.g. at least one of reference cell and the measured cell is on the different carrier frequency from the serving cell carrier frequency). The RSTD measurements can be performed in RRC_CONNECTED state or in RRC_IDLE state (e.g. for NB-IoT).

Considering OTDOA support for narrow band, such as NB-IoT, may require extensive accumulations, e.g. over 320 NPRS subframes, according to the requirements in 3GPP TS 36.133. However, for a NB-IoT carrier, limited downlink radio resources are available for positioning purposes. In Release 14, a new reference signal has been designed for positioning of NB-IoT UE, referred to as Narrowband Positioning Reference Signal (NPRS), which has synergies with PRS of Release 9 LTE and FeMTC.

Narrowband positioning reference signals (NPRSs) are transmitted in resource blocks in NB-IoT carriers configured for NPRS transmission. In a subframe configured for NPRS transmission, the starting positions of the OFDM symbols configured for NPRS transmission shall be identical to those in a subframe in which all OFDM symbols have the same cyclic prefix length as the OFDM symbols configured for NPRS transmission. NPRS are defined for $\Delta f=15$ kHz and normal CP only. NPRSs are transmitted on antenna port 2006.

Sequence Generation (as Described in 3GPP TS 36.211)

The NPRS sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

where $n_s$ is the slot number within a radio frame, l is the OFDM symbol number within the slot. The pseudo-random sequence c(i) is defined in clause 7.2 of 3GPP TS 36.211. The pseudo-random sequence generator shall be initialised with $$c_{init} = 2^{28} \cdot \lfloor N_{ID}^{NPRS}/512 \rfloor + 2^{10} \cdot (7 \cdot (n_s+1) + l + 1) \cdot (2 \cdot (N_{ID}^{NPRS} \bmod 512) + 1) + 2 \cdot (N_{ID}^{NPRS} \bmod 512) + N_{CP}$$

at the start of each OFDM symbol where equals $N_{ID}^{NPRS} \in \{0, 1, \ldots, 4095\}$ equals $N_{ID}^{Ncell}$ unless configured by higher layers and where $N_{CP}=1$.

Mapping to Resource Elements

For an NB-IoT carrier which is configured for NPRS transmission, the reference signal sequence $r_{l,n_s}(m)$ shall be mapped to complex-valued modulation symbols $a_{k,l}^{(p)}$ used as reference signal for antenna port p in slot $n_s$ according to $$a_{k,l}^{(p)} = r_{l,n_s}(m')$$

where, when the higher layer parameter when the higher layer parameter operationModeInfoNPRS for the configured NB-IoT carrier is set to in-band $$k = 6m + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and (1 or 2 } PBCH \text{ antenna ports)} \\ 2, 3, 5, 6 & \text{if } n_s \bmod 2 = 1 \text{ and (4 } PBCH \text{ antenna ports)} \end{cases}$$

$$m = 0, 1$$

$$m' = m + 2n'_{PRB} + N_{RB}^{max,DL} - \tilde{n}$$

where $n_{PRB}'$ is signalled by higher layers nprs-SequenceInfo, and $\tilde{n}=1$ if the higher layer parameter nprs-SequenceInfo indicates $N_{RB}^{DL}$ is odd, and $\tilde{n}=0$ if the higher layer parameter nprs-SequenceInfo indicates $n_{RB}^{DL}$ is even.

when the higher layer parameter operationModeInfoNPRS for the configured NB-IoT carrier is set to stand-alone or guard-band
k=6m+(6−l+$v_{shift}$)mod 6
l=0, 1, 2, 3, 4, 5, 6
m=0, 1
m'=m+$N_{RB}^{max,DL}$−1
and where $v_{shift}=N_{ID}^{NPRS}$ mod 6. If $N_{ID}^{NPRS}$ is not configured by higher layers, $N_{ID}^{NPRS}=N_{ID}^{Ncell}$. The number of PBCH antenna ports is signalled by higher layers.

If higher layer parameter nprsBitmap is not configured, resource elements in OFDM symbols 5 and 6 in each slot shall not be used for transmission of NPRS.

Mapping to Resource Element Visualization

The sequence $r_{l,n_s}$ contains 220 QPSK PRS symbols, and what symbols are selected from $r_{l,n_s}$ is explained in the section above. A graphical representation of the selection of symbols from sequence $r_{l,n_s}$ for creating the NPRS is illustrated in FIG. 3.

FIG. 3 illustrates that two of the symbols (1 RB) are used in the 220 symbols long PRS for NPRS, denoted as the virtual PRS. FIG. 4 is an example NPRS for two radio frames illustrating the selected symbols from sequence $r_{l,n_s}$. It is noted that the same QPSK symbols are selected in each radio frame, SFN N and SFN N+1.

SUMMARY

It is an object of the present disclosure to obviate or mitigate at least one disadvantage of the prior art.

There are provided systems and methods for configuring and generating Narrowband Positioning Reference Signals (NPRS) for NB-IoT.

In a first aspect of the present disclosure there is provided a method performed by a wireless device. The wireless device can comprise a radio interface and processing circuitry and be configured to obtain narrowband positioning reference signal (NPRS) configuration information indicating a system frame number (SFN) dependent resource mapping; obtain a NPRS in accordance with the SFN dependent resource mapping; and perform at least one radio measurement operation using the NPRS to estimate at least one signal characteristic.

In some embodiments, the NPRS configuration information indicates to use Type 2 NPRS for mapping to resource elements.

In some embodiments, obtaining the NPRS can comprise receiving the NPRS from a network node. In other embodiments, obtaining the NPRS can comprise generating a NPRS sequence, and selecting modulation symbols from the generated NPRS sequence in accordance with the SFN dependent resource mapping.

In some embodiments, the SFN dependent resource mapping can include a function of at least one of the SFN, a number of NPRS resource elements per resource block, a number of NPRS resource elements per symbol, a NPRS resource element density, a NPRS occasion length (Nnprs), and/or a NPRS periodicity (Tnprs).

In some embodiments, the SFN dependent resource mapping can include at least one modulus factor (K). A first modulus factor can be associated with a downlink bandwidth. A second modulus factor is associated with the SFN. The second modulus factor can be varied as a function of the SFN. In some embodiments, a modulus factor can be associated with at least one of a number of resource blocks for generating the NPRS sequence, a number of resource blocks of a virtual reference bandwidth for generating the NPRS sequence, and/or a NPRS resource element density.

In some embodiments, the wireless device reports the at least one signal characteristic to a network node.

In some embodiments, the wireless device receives a request for capability information associated with supporting NPRS generation with the SFN dependent resource mapping. The wireless device can further transmit capability information associated with supporting NPRS generation with the SFN dependent resource mapping.

In another aspect of the present disclosure there is provided a method performed by a network node. The network node can comprise a radio interface and processing circuitry and be configured to transmit narrowband positioning reference signal (NPRS) configuration information indicating a system frame number (SFN) dependent resource mapping; and obtain at least one estimated signal characteristic associated with the transmitted NPRS configuration.

In some embodiments, the network node can provide a NPRS in accordance with the SFN dependent resource mapping. In some embodiments, the NPRS can be transmitted by a second network node. In some embodiments, providing the NPRS can comprise generating a NPRS sequence, and selecting modulation symbols from the generated NPRS sequence in accordance with the SFN dependent resource mapping.

In some embodiments, the NPRS configuration information indicates to use Type 2 NPRS for mapping to resource elements.

In some embodiments, the SFN dependent resource mapping can includes a function of at least one of the SFN, a number of NPRS resource elements per resource block, a number of NPRS resource elements per symbol, a NPRS resource element density, a NPRS occasion length (Nnprs), and/or a NPRS periodicity (Tnprs).

In some embodiments, the SFN dependent resource mapping can include at least one modulus factor (K). A first modulus factor can be associated with a downlink bandwidth. A second modulus factor can be associated with the SFN. In some embodiments, a modulus factor can be associated with at least one of a number of resource blocks for generating the NPRS sequence, a number of resource blocks of a virtual reference bandwidth for generating the NPRS sequence, and/or a NPRS resource element density.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
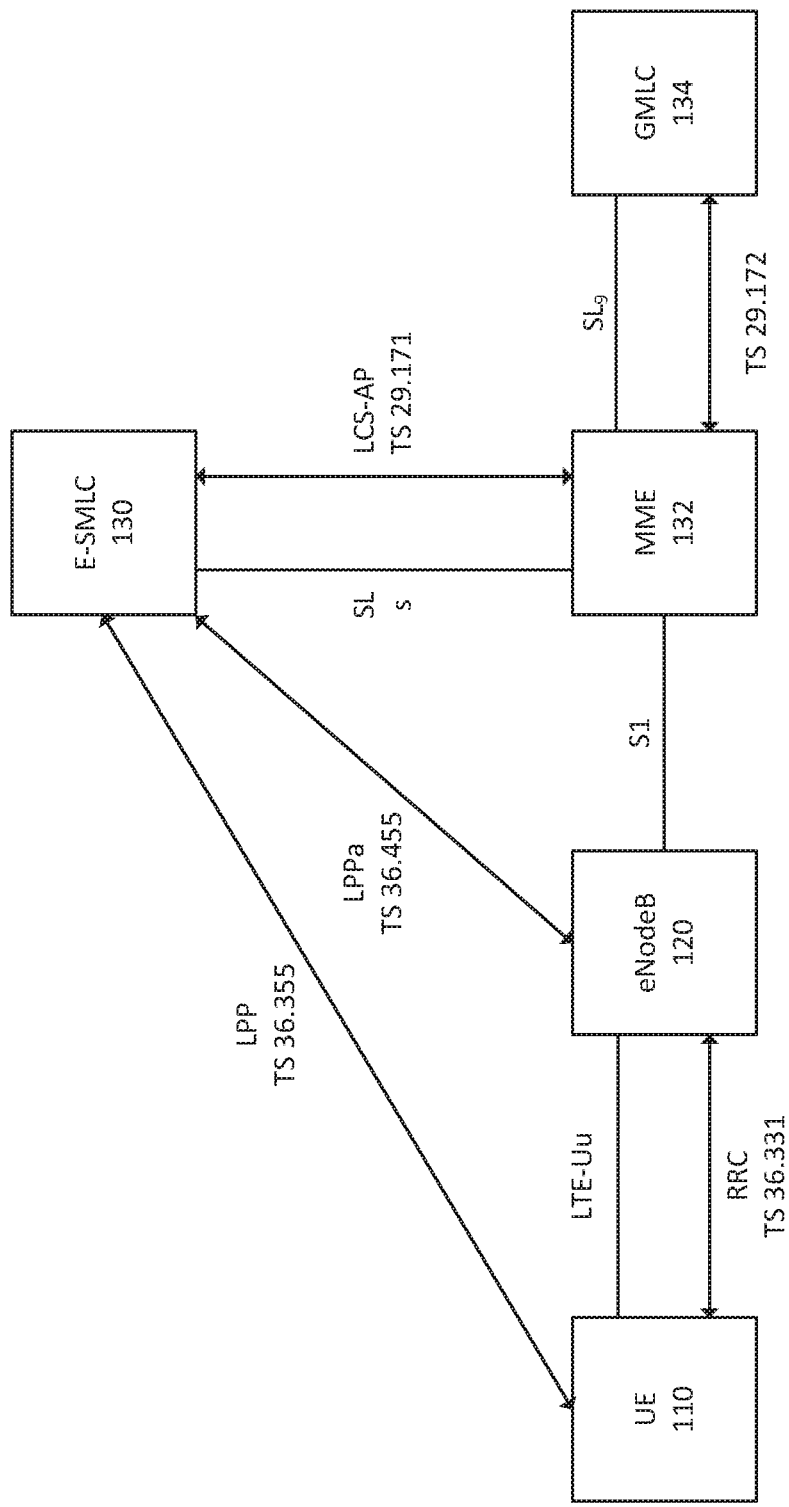
FIG. 1 illustrates an example network architecture.
Figure 2:
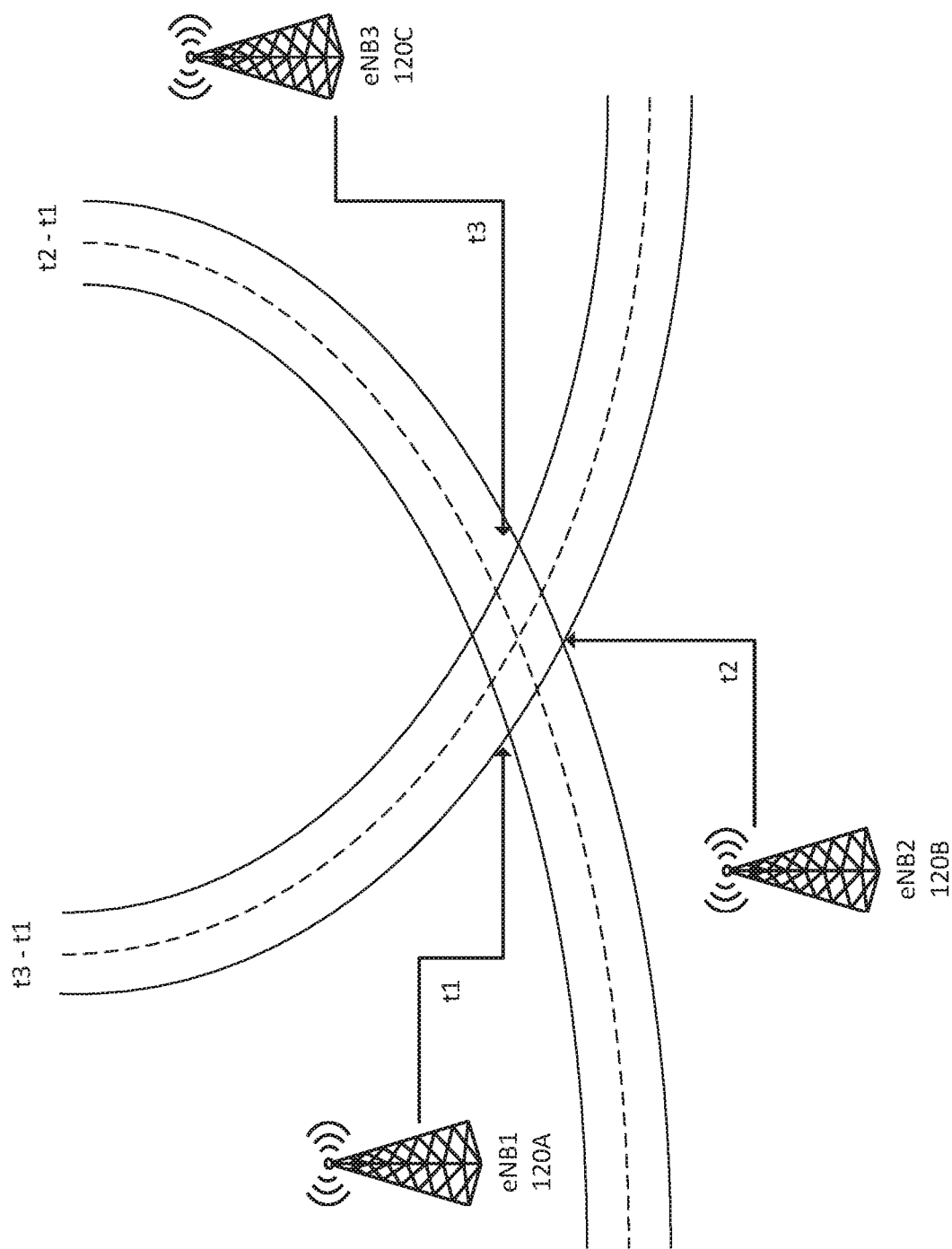
FIG. 2 illustrates an example OTDOA position estimation.
Figure 3:
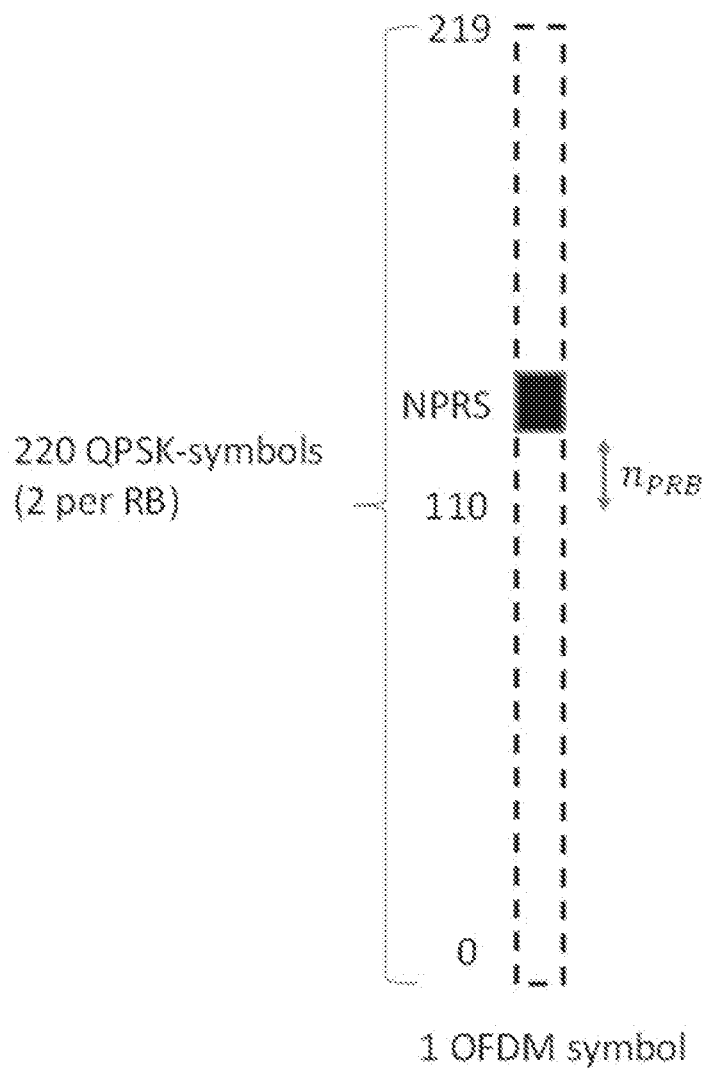
FIG. 3 illustrates an example of symbol selection for generating a NPRS.
Figure 4:
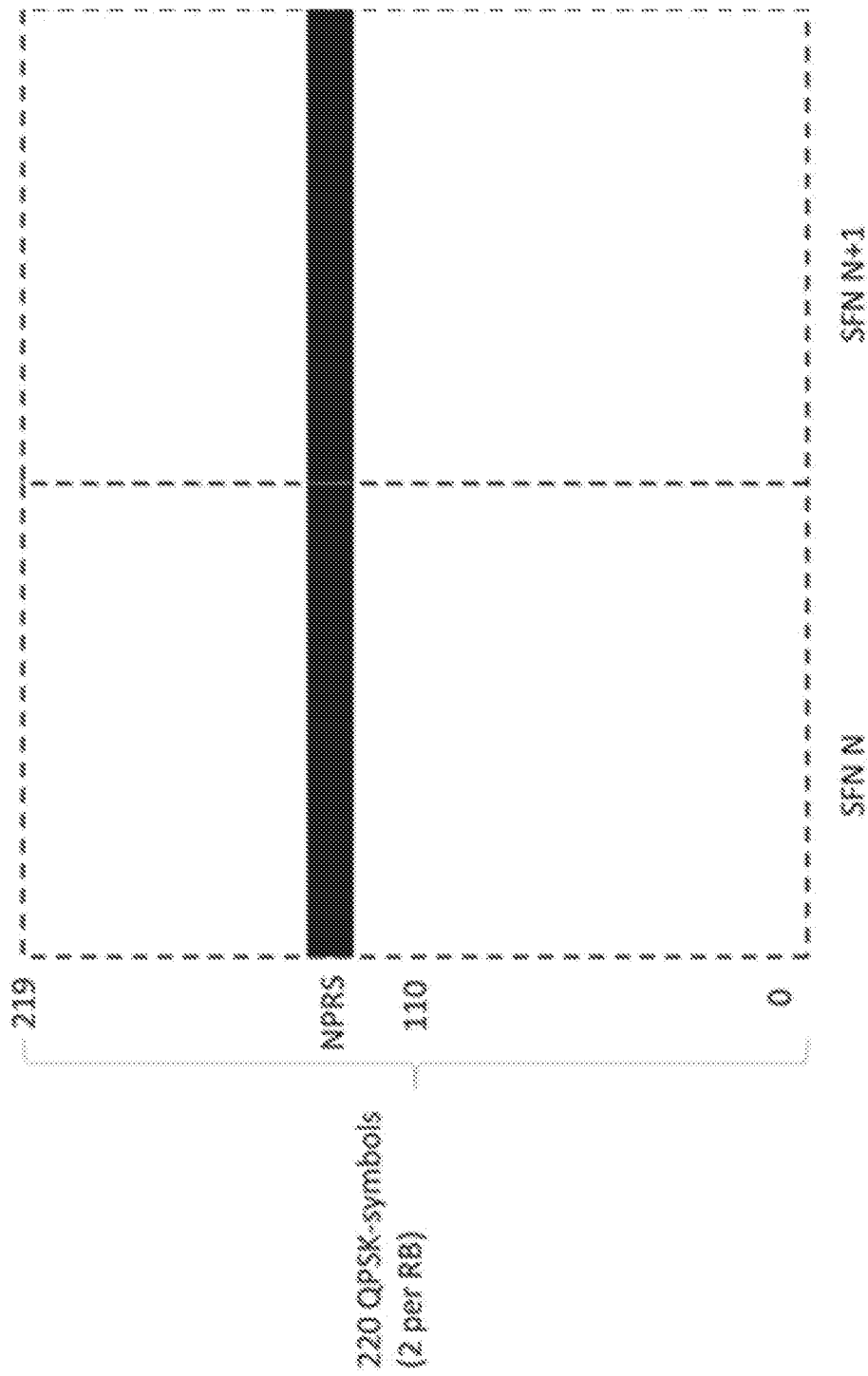
FIG. 4 illustrates an example of selected symbols from sequence $r_{l,n_s}$.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB 1, etc. Example embodiments of a UE are described in more detail below with respect to FIG. 9.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 11.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a wireless device or a network node.

In some embodiments, a UE can be configured to operate in carrier aggregation (CA) implying aggregation of two or more carriers in at least one of downlink (DL) and uplink (UL) directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different transmission points of the same (shared) cell.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re)selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Figure 5:
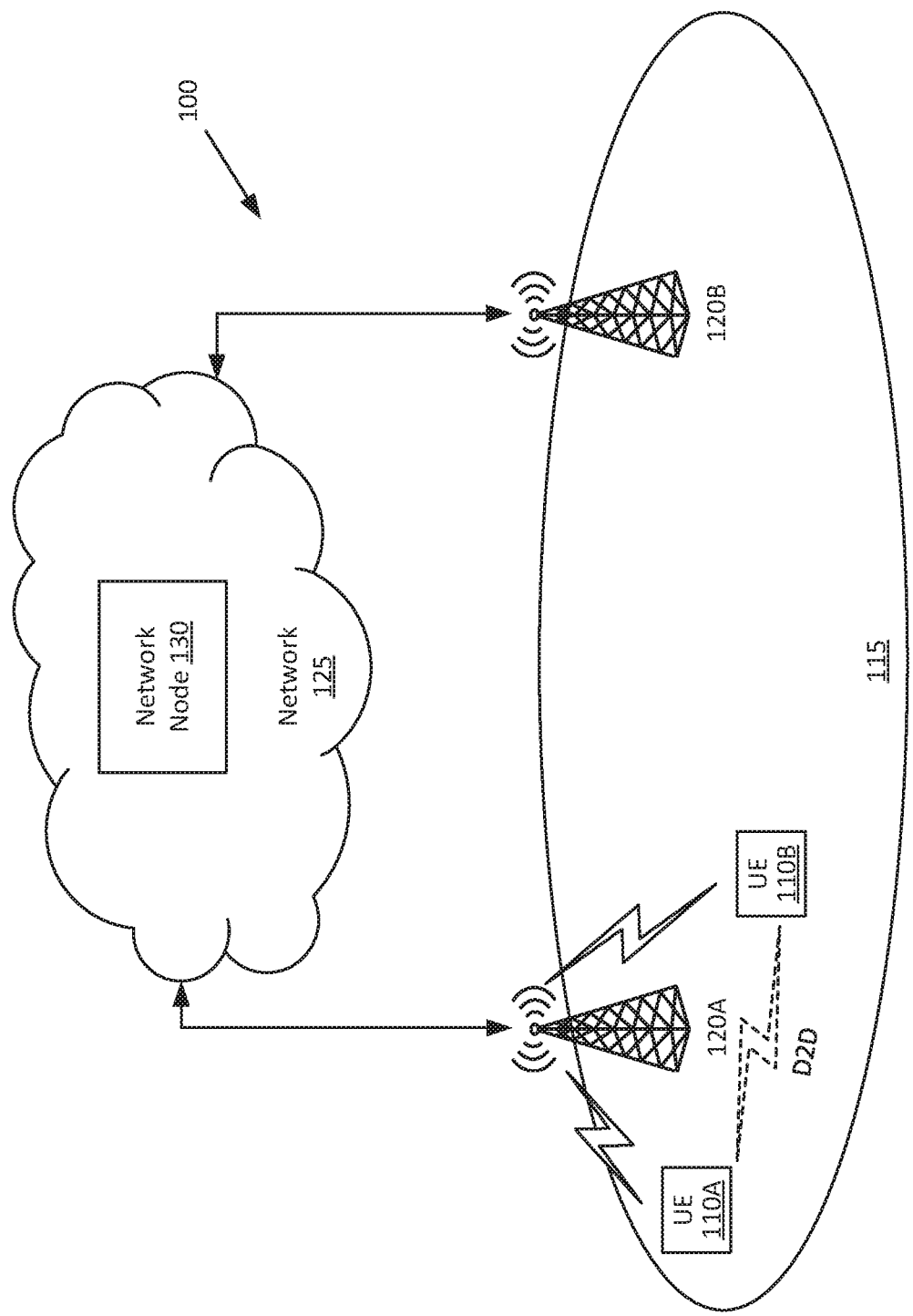
FIG. 5 illustrates an example wireless network.

FIG. 5 illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes over an internode interface.

In some embodiments, network node 130 can be a location server 130, such as an E-SMLC. Location server 130 can exchange signals directly, or indirectly, with UEs 110, radio access nodes 120 and/or other network nodes as was illustrated in FIG. 1.

The conventional NPRS requires a lot of repetition to allow an IoT device to receive a good enough signal. For example, up to 320 NPRS subframes can be used by a NB-IoT UE to meet the RSTD accuracy requirements. With the conventional NPRS definition, the NPRS repeats itself (e.g. is identical) every radio frame, which can lead to poor correlation properties. This has been shown in 3GPP evaluations, and solutions have been proposed to mitigate this issue which follow an approach of basing the sequence initializer ($c_{init}$) on the system frame number, also called the SFN or radio frame number. These solutions, however, do not keep the property of generating unique sequences.

For example, in R1-1801885, "On NPRS for OTDOA", source Huawei, HiSilicon, 3GPP TSG RAN WG1 Meeting #92, Athens, Greece, Feb. 26-Mar. 2, 2018, the proposed sequences do not use the rightmost bits (bits 1 to 9 from the right). This can create colliding NPRS sequences in some scenarios. This is not desirable, as it increases the chance that a UE will measure a wrong cell.

For example, in R1-1802300, "On NPRS performance", source Qualcomm Incorporated, 3GPP TSG RAN WG1 Meeting #92, Athens, Greece, Feb. 26-Mar. 2, 2018, it was proposed to design NPRS sequences with extended effective length to reduce the impact of false peak. The proposed NPRS design is as follows:

$$c_{init} = 2^{28} \left\lfloor \frac{N_{ID}^{NPRS}}{512} \right\rfloor +$$
$$2^{10}(7 \cdot (\tilde{n}_s + 1) + l + 1) \cdot (2 \cdot (N_{ID}^{NPRS} \bmod 512) + 1) + 2 \cdot (N_{ID}^{NPRS} \bmod 512) + N_{CP}$$

where $\tilde{n}_s = n_s + 20 \times (SFN \bmod K)$.

However, this proposed sequence initialization generates $c_{init}$ values larger than 31 bits (while $c_{init}$ is 31 bits). For example, consider K=2, the value of ns=19, SFN=2, nprsID=4041, 1, the value of $c_{init}$ is 2147956626, and represented by 1000 0000 0000 0111 0011 0111 1001 0010 (32 bits) which is longer than the supported 31 bits for $c_{init}$.

Some embodiments described herein propose to modify the derivation of NPRS by making the resource mapping based at least in part on the SFN and combining it with NPRS sequence generation. Some embodiments will be described with respect to NPRS but can also be applied to other types of positioning reference signals, including PRS, which could benefit FeMTC and/or cat M1 and cat M2 UEs.

Figure 6:
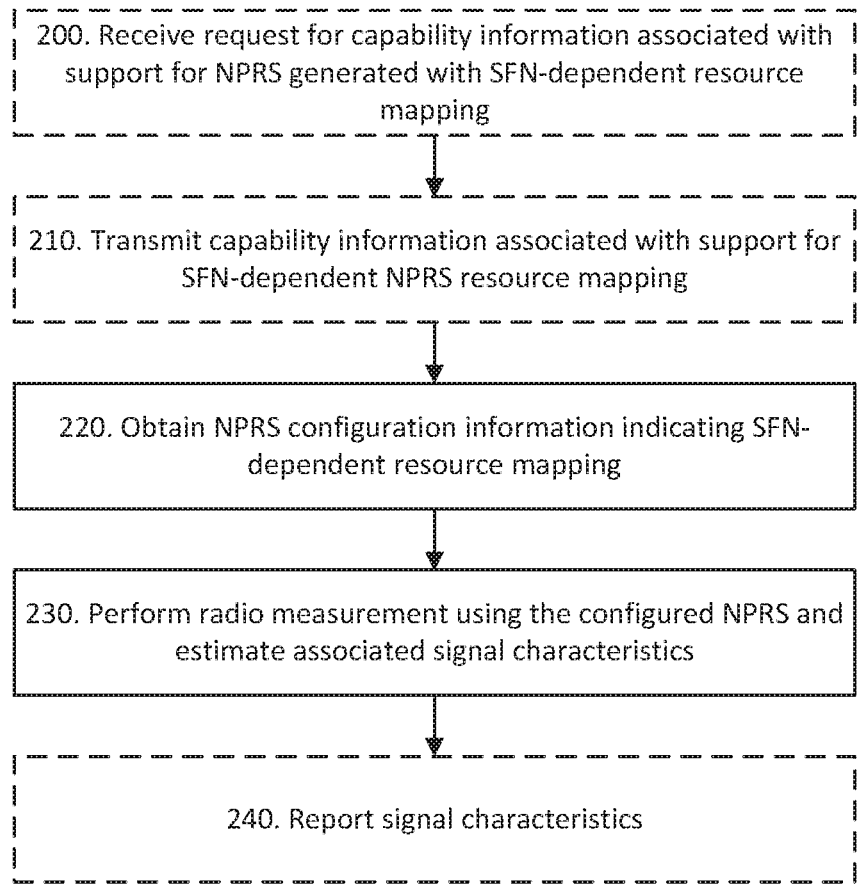
FIG. 6 is a flow chart illustrating a method which can be performed in a wireless device.

FIG. 6 is a flow chart illustrating a method which can be performed in a wireless device (e.g. a target device), such as UE 110. The method can include:

Step 200: Optionally, the wireless device can receive, from a network node, a request for capability information associated with supporting NPRS generation using a SFN-dependent resource mapping.

Step 210: Optionally, the wireless device can transmit, to the network node, a response indicating the device's capability information associated with supporting NPRS generation using a SFN-dependent resource mapping.

Step 220: The wireless device obtains, from a network node such a location server, NPRS configuration/generation information indicating at least one SFN-dependent resource mapping. In some embodiments, the NPRS configuration information can indicate to the wireless device to use Type 2 NPRS for mapping to resource elements.

In some embodiments, the SFN-dependent resource mapping can include a function of at least one or more of the following parameters: the SFN, the number of NPRS resource elements per RB, the number of NPRS resource elements per symbol, the NPRS resource element density, the NPRS occasion length (Nnprs), and/or the NPRS periodicity (Tnprs).

In some embodiments, the SFN-dependent resource mapping can include at least one modulus factor (K). The modulus factor(s) can be associated with at least one or more of the following parameters: the SFN, the downlink bandwidth, the number of RBs used for generating the NPRS sequence, the number of RBs of a virtual reference bandwidth used for generating the NPRS sequence, and/or the NPRS resource element density.

In some embodiments, the wireless device further obtains a NPRS in accordance with the indicated SFN-dependent resource mapping. In some embodiments, obtaining the NPRS can comprise receiving the NPRS from a network node, such as a radio access node. In some embodiments, obtaining the NPRS can comprise the wireless device generating a NPRS sequence and selecting modulation symbols from the generated NPRS sequence in accordance with the SFN dependent resource mapping.

Step 230: The wireless device performs radio measurement operation(s) using the NPRS. The wireless device can "match" received signals to the configured NPRS to estimate at least one associated signal characteristic.

Step 240: The wireless device can transmit, to a network node, a measurement report including the estimated signal characteristic(s).

It will be appreciated that one or more of the above steps can be performed simultaneously and/or in a different order. Also, steps illustrated in dashed lines are optional and can be omitted in some embodiments.

Figure 7:
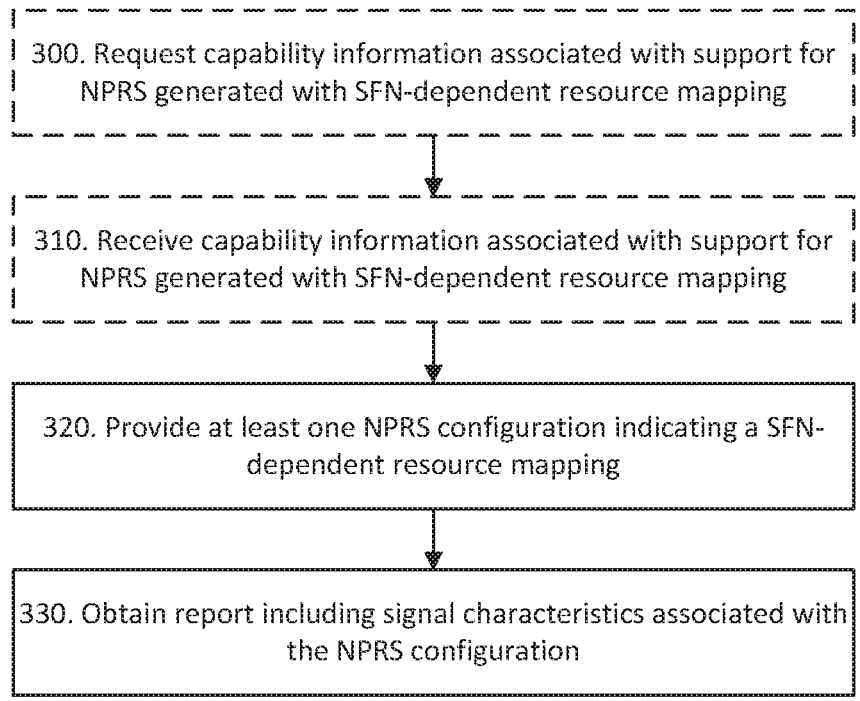
FIG. 7 is a flow chart illustrating a method which can be performed in a network node.

FIG. 7 is a flow chart illustrating a method which can be performed in a network node. In some embodiments, the network node can be a positioning node such as location server 130. The location server 130 can be a E-SMLC as has been described herein. In some embodiments, the network node can be a radio access node 120. The radio access node 120 can be an eNB or gNB as have been described herein. In some embodiments, the functionality of a location server and a radio access node can be co-located. The method can include:

Step 300: Optionally, the network node transmits, to a wireless device, a request for capability information associated with supporting NPRS generation using a SFN-dependent resource mapping.

Step 310: Optionally, the network node receives, from the wireless device, a response indicating the device's capability information associated with supporting NPRS generation using a SFN-dependent resource mapping.

Step 320: The network node provides, to a wireless device, NPRS configuration/generation information indicating at least one SFN-dependent resource mapping. In some embodiments, the NPRS configuration information can indicate to the wireless device to use Type 2 NPRS for mapping to resource elements.

In some embodiments, the wireless device is further provided a NPRS corresponding to the indicated SFN-dependent resource mapping configuration. In some embodiments, the NPRS can be transmitted, to the wireless device, from a second network node. In some embodiments, the second network node is the same as the first network node or can be co-located with the first network node.

Step 330: The network node obtains, from a wireless device, a report indicating estimated signal characteristic(s) associated with the configured NPRS.

It will be appreciated that one or more of the above steps can be performed simultaneously and/or in a different order. Also, steps illustrated in dashed lines are optional and can be omitted in some embodiments.

Figure 8:
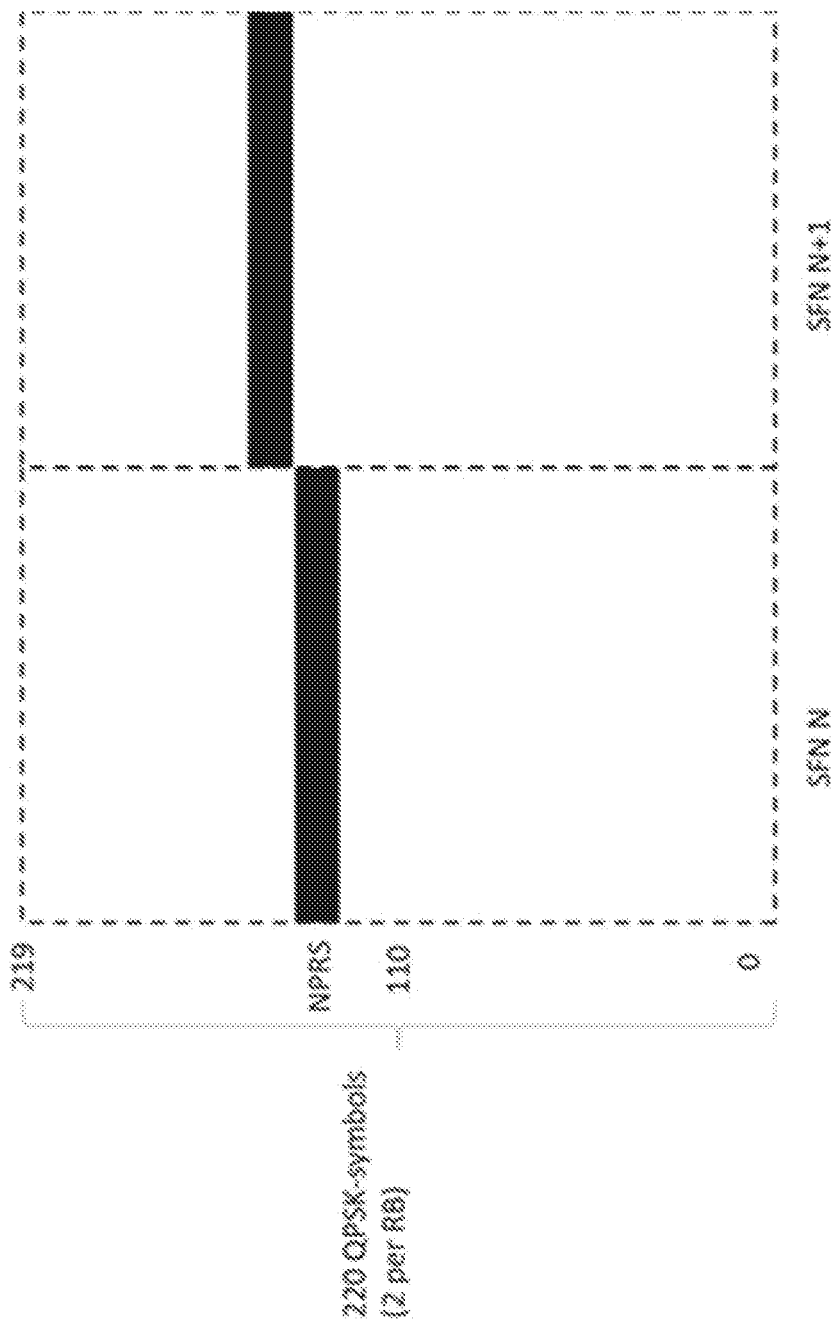
FIG. 8 illustrates an example selection of symbols from $r_{l,n_s}$.

Some embodiments utilize the unused symbols in the virtual 220 symbol PRS based on the SFN. FIG. 8 illustrates an example of the proposed selection of symbols from $r_{l,n_s}$.

Resource Mapping

Some embodiments may require changes to standardization including modifying the selected symbols of $r_{l,n_s}$, for example according to:

Legacy: $a_{k,l}^{(p)} = r_{l,n_s}(m')$

Proposed: $a_{k,l}^{(p)} = r_{l,n_s}((m' + SFN) \bmod K)$, where K=110

In this example, K=110 to create maximum number of sequences, but K can also be smaller in some embodiments. In other embodiments K can be larger than 110. Note that K is limited by the number of resource blocks (RBs) of a virtual reference bandwidth for deriving the sequence, and that the NR-related standards are expected to have larger bandwidths and more RBs. The virtual reference bandwidth may be the same as the system bandwidth, in one example, but it may also be different from the system bandwidth in another example.

In another example, K=max(Kmin, system bandwidth), where Kmin is the minimum number of RBs for the NPRS sequence generation methods according to the embodiments described herein (e.g. Kmin=50), and system bandwidth is DL bandwidth of a cell. K may be a fixed value pre-defined in the standard or it may be configured by a network node and signaled to the wireless device in the OTDOA assistance data via broadcast or dedicated signaling such as LPP.

In some embodiments, the SFN-dependent NPRS sequence can be transmitted in the same frequency resources as a NPRS without SFN-dependent resource mapping. In another embodiment, a shifted NPRS sequence is mapped to shifted frequency resources (RBs), where the shift in frequency is related to SFN (e.g. in SFN1 the NPRS is transmitted in frequency resources R1 and, in SFN2, the NPRS is transmitted in frequency resources R2). The UE measurement bandwidth and measured frequency resources would shift accordingly.

In another embodiment:

$$a_{k,l}^{(p)} = r_{l,n_s}((m'+f) \bmod K), \text{ where}$$

f can be a function of one or more of: SFN, number of NPRS resource elements per RB and/or symbol, NPRS resource element density, NPRS occasion length (Nnprs), NPRS periodicity (Tnprs), index of the current NPRS occasion with respect to SFN0, or 10*SFN/Tnprs.

K can be a function of a bandwidth and/or a number of NPRS resource elements over a bandwidth and/or NPRS resource element density.

In one example:

$$a_{k,l}^{(p)} = r_{l,n_s}((m'+2\times SFN) \bmod 220)$$

In this example, the 2 (in 2×SFN) is the number of NPRS per RB and symbol, and 220 is the number of NPRS resource elements over a reference virtual bandwidth (e.g. 110 RBs, each with 2 NPRS per symbol).

In a further embodiment, the NPRS sequence generation for the time-frequency resources TFR1 can be generated according to a first method/mechanism if the TFR1 are measured only by UEs capable of correctly generating/receiving the signal generated according to that first method. The NPRS sequence generation for the time-frequency resources TFR2 can be generated according to a second method/mechanism if the TFR2 are measured by at least one UE which is not capable of the first method. A UE supporting the first method may determine TFR1 and TFR2, for example, based on a network indication/message or based on a pre-defined rule (e.g. in TFR2 comprise specific subframes such as subframe #0), and select the first and the second methods accordingly. A UE not supporting the first method would not be configured with RSTD measurements in TF1, for example, based on the UE capability positioning node configuring the OTDOA assistance data to not include TFR1. Also, related to this embodiment, a radio network node (e.g. eNB, gNB) may generate NPRS based on a first method and a second method in TFR1 and TFR2 and maintain the resource partitioning between TFR1 and TFR2, which may further be indicated to the positioning node which in this way determines TFR1 and TFR2 for each of the cell and uses this information accordingly when generating OTDOA assistance data to UE.

Accordingly, depending on the configuration and/or requirements, it is possible to vary the modulus factor (K) and the resource mapping as a function of the SFN when generating NPRS sequences.

Standardization Notes

In Release 14, to solve the PCI collision problem, new $c_{init}$ was introduced with new $N_{ID}^{NPRS}$ instead of the PCIDs. As $c_{init}$ was agreed upon, it may not be desirable to modify the $c_{init}$. Instead, it can be considered to modify the $r_{l,n_s}(m)$ parameter. This not only gives the benefits of having a backward compatible solution, but also can generate longer NPRS sequences which provides better correlation properties than the current NPRS. More specifically, it may be preferable to change the resource mapping instead of changing the initialization of the sequence.

The optional steps in the methods of FIGS. 6 and 7 (e.g. steps 200, 210 and 300, 310) can be used to provide and obtain device capabilities related to supporting SFN-based NPRS generation. In the case where one or more devices only supports NPRS generation without SFN, the network can take the decision to use K=1, corresponding to no SFN dependent NPRS generation.

Figure 9:
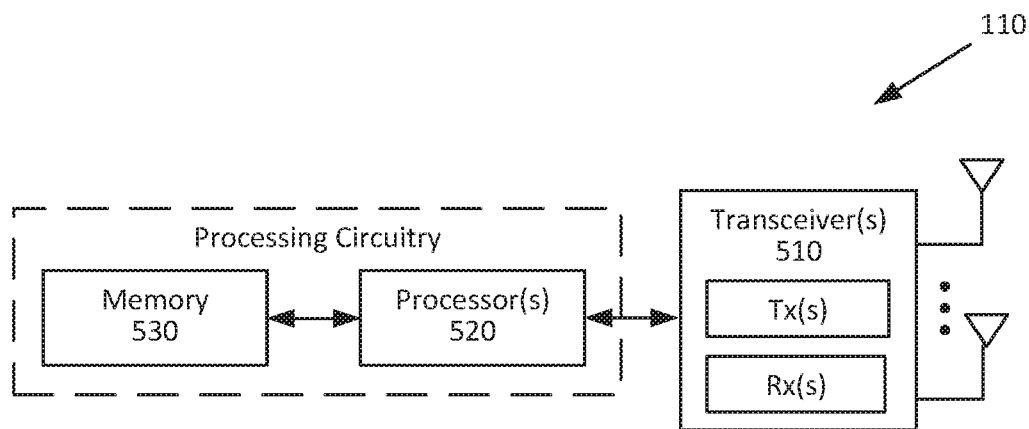
FIG. 9 is a block diagram of an example wireless device.

FIG. 9 is a block diagram of an example wireless device, UE 110, in accordance with certain embodiments. In some embodiments, wireless device 110 can be a NB-IoT device. UE 110 includes a transceiver 510, processor 520, and memory 530. In some embodiments, the transceiver 510 facilitates transmitting wireless signals to and receiving wireless signals from radio access node 120 (e.g., via transmitter(s) (Tx), receiver(s) (Rx) and antenna(s)). The processor 520 executes instructions to provide some or all of the functionalities described above as being provided by UE, and the memory 530 stores the instructions executed by the processor 520. In some embodiments, the processor 520 and the memory 530 form processing circuitry.

The processor 520 can include any suitable combination of hardware to execute instructions and manipulate data to perform some or all of the described functions of a wireless device, such as the functions of UE 110 described above. In some embodiments, the processor 520 may include, for example, one or more computers, one or more central processing units (CPUs), one or more microprocessors, one or more application specific integrated circuits (ASICs), one or more field programmable gate arrays (FPGAs) and/or other logic.

The memory 530 is generally operable to store instructions, such as a computer program, software, an application including one or more of logic, rules, algorithms, code, tables, etc. and/or other instructions capable of being executed by a processor 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 520 of UE 110.

Other embodiments of UE 110 may include additional components beyond those shown in FIG. 9 that may be responsible for providing certain aspects of the wireless device's functionalities, including any of the functionalities described above and/or any additional functionalities (including any functionality necessary to support the solution described above). As just one example, UE 110 may include input devices and circuits, output devices, and one or more synchronization units or circuits, which may be part of the processor 520. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 10:
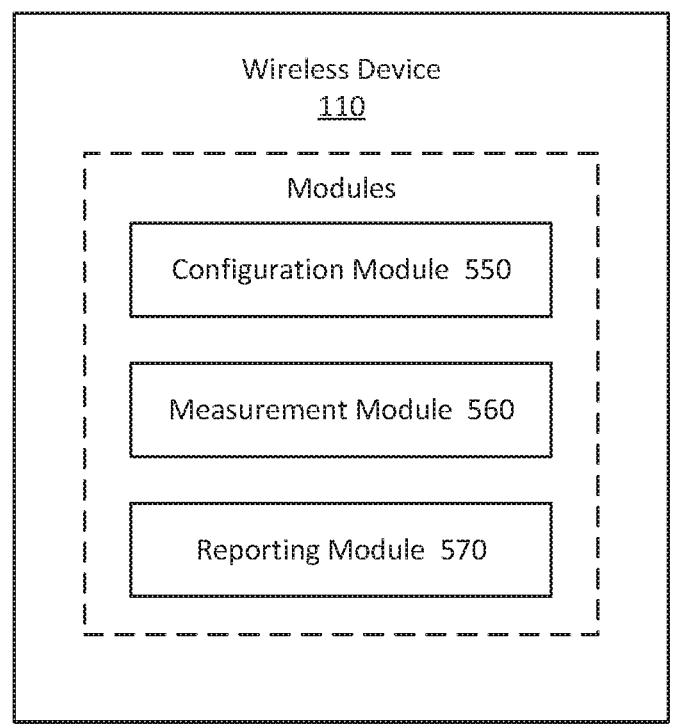
FIG. 10 is a block diagram of an example wireless device with modules.

In some embodiments, the wireless device UE 110 may comprise a series of modules configured to implement the functionalities of the wireless device described above. Referring to FIG. 10, in some embodiments, the wireless device 110 may comprise a configuration module 550 for obtaining and configuring NPRS configuration/generation information, a measurement module 560 for performing radio measurements and estimating signal chrematistics, and a reporting module 570 for reporting estimated signal characteristics to a network node.

It will be appreciated that the various modules may be implemented as combination of hardware and software, for instance, the processor, memory and transceiver(s) of UE 110 shown in FIG. 9. Some embodiments may also include additional modules to support additional and/or optional functionalities.

Figure 11:
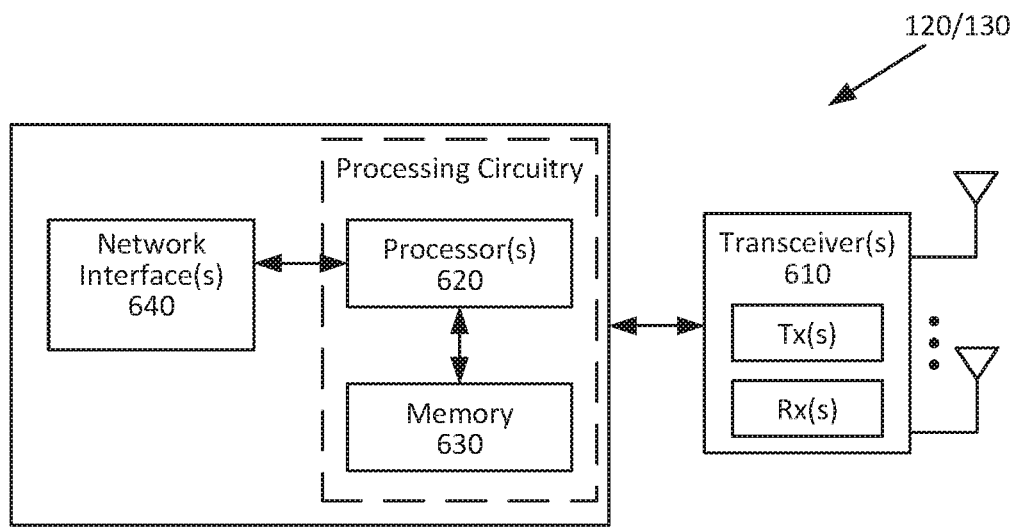
FIG. 11 is a block diagram of an example network node.

FIG. 11 is a block diagram of an exemplary network node 120/130, in accordance with certain embodiments. In some embodiments, the network node 120/130 can be a positioning node such as location server 130. The location server 130 can be a E-SMLC as has been described herein. In some embodiments, the network node 120/130 can be a radio access node 120. The radio access node 120 can be an eNB or gNB as have been described herein. In some embodiments, the functionality of a location server 130 and a radio access node 120 can be co-located in a network node.

Network node 120/130 can include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by a radio access node 120, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of network node 120/130, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for network node 120/130, send output from node 120, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of network node 120/130 can include additional components beyond those shown in FIG. 11 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIGS. 9 and 11 may be included in other network nodes. Other network nodes may optionally include or not include a wireless interface (such as the transceiver described in FIGS. 9 and 11).

Figure 12:
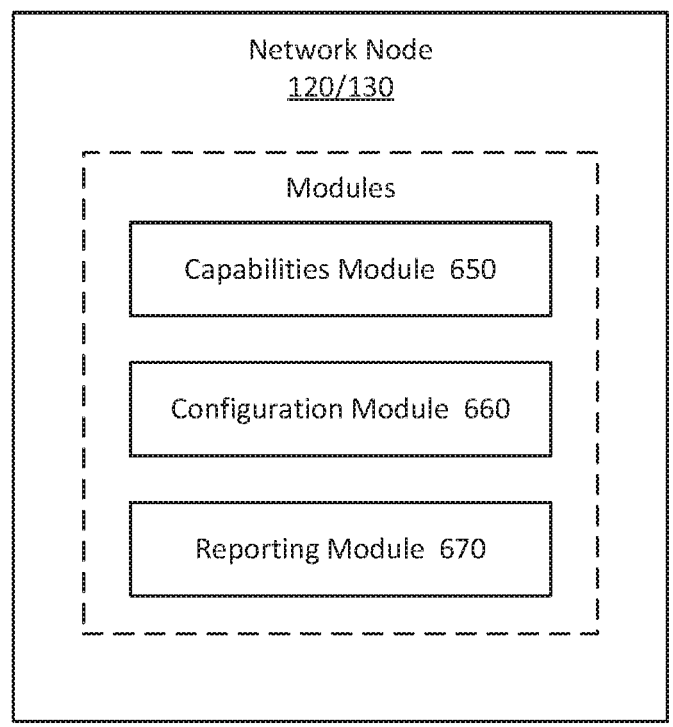
FIG. 12 is a block diagram of an example network node with modules.

In some embodiments, the network node 120/130, may comprise a series of modules configured to implement the functionalities of the network node described above. Referring to FIG. 12, in some embodiments, network node 120/130 can comprise a capabilities module 650 for requesting and receiving for NPRS support information, a configuration module 660 for determining and transmitting NPRS configuration and/or generation information, and a reporting module 670 for obtaining signal characteristic(s) associated with the NPRS.

It will be appreciated that the various modules may be implemented as combination of hardware and software, for instance, the processor, memory and transceiver(s) of network node 120/130 shown in FIG. 11. Some embodiments may also include additional modules to support additional and/or optional functionalities.

Simulation

As discussed herein, the conventional NPRS generation only uses two symbols (1 RB) of the 220 generated in each OFDM symbol. In the conventional NPRS generation, when having 1 or 2 PBCH antennas ports, there can be PRS in l=3, 5, 6 for even ns, and l=1, 2, 3, 5, 6 for odd ns. Since ns=0 . . . 19, this provides (3*10+6*10)=80 different PRS symbols. The embodiments described herein provide for selecting 2 symbols (2 RB) of the 220 generated, based on the SFN. This creates 80×110 different PRS symbols. This can enable better autocorrelation and cross-correlation properties as illustrated in FIGS. 13 and 14.

Figure 13:
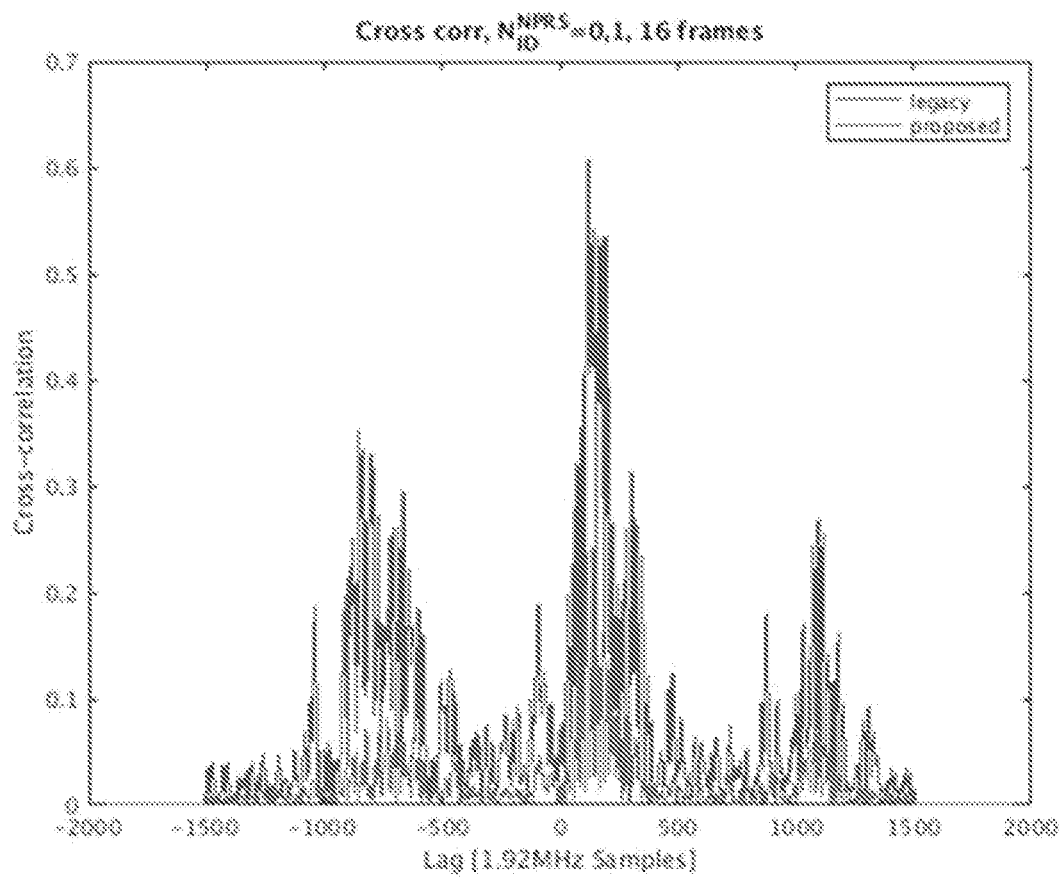
FIG. 13 is an example of simulated cross-correlation from NPRSid=0, and NPRS_id=1 for 16 radio frames (SFN= 0 . . . 15)

FIG. 13 is an example of simulated cross-correlation from NPRSid=0, and NPRS_id=1 for 16 radio frames (SFN= 0 . . . 15).

Figure 14:
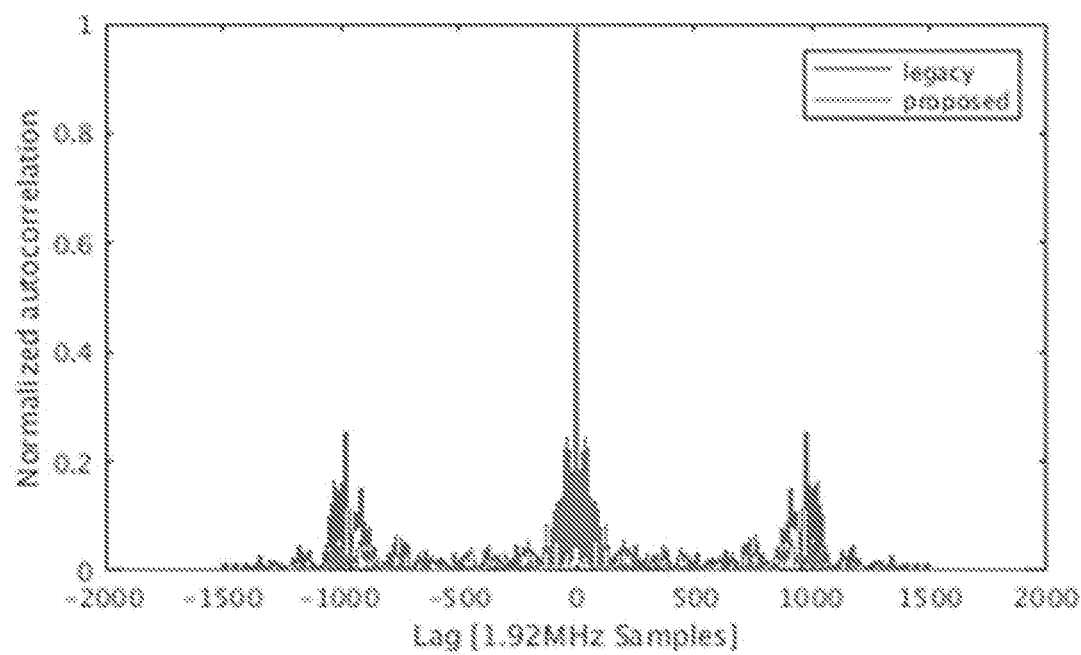
FIG. 14 is an example of simulated autocorrelation for NPRSid=0 for 16 radio frames (SFN=0 . . . 15).

FIG. 14 is an example of simulated autocorrelation for NPRSid=0 for 16 radio frames (SFN=0 . . . 15).

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Glossary

The present description may comprise one or more of the following abbreviation:
3GPP Third Generation Partnership Project
ACK Acknowledgement
AP Access point
ARQ Automatic Repeat Request
BS Base Station
BSC Base station controller
BTS Base transceiver station
CA Carrier Aggregation
CC Component carrier
CCCH SDU Common Control Channel SDU
CG Cell group
CGI Cell Global Identifier
CQI Channel Quality information
CSI Channel State Information
DAS Distributed antenna system
DC Dual connectivity
DCCH Dedicated Control Channel
DCI Downlink Control Information
DL Downlink
DMRS Demodulation Reference Signal
eMBB Enhanced Mobile Broadband
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDM Frequency Division Multiplexing
HARQ Hybrid Automatic Repeat Request
HO Handover
IoT Internet of Things
LTE Long-Term Evolution
M2M Machine to Machine
MAC Medium Access Control
MBMS Multimedia Broadcast Multicast Services
MCG Master cell group
MDT Minimization of Drive Tests
MeNB Master eNode B
MME Mobility Management Entity
MSC Mobile Switching Center
MSR Multi-standard Radio
MTC Machine Type Communication
NACK Negative acknowledgement
NDI Next Data Indicator
NR New Radio
O&M Operation and Maintenance
OFDM Orthogonal Frequency Division Multiplexing
OFDMA Orthogonal Frequency Division Multiple Access
OSS Operations Support System
PCC Primary Component Carrier
P-CCPCH Primary Common Control Physical Channel
PCell Primary Cell
PCG Primary Cell Group
PCH Paging Channel
PCI Physical Cell Identity
PDCCH Physical Downlink Control Channel
PDSCH Physical Downlink Shared Channel
PDU Protocol Data Unit
PGW Packet Gateway
PHICH Physical HARQ indication channel
PMI Precoder Matrix Indicator
ProSe Proximity Service
PSC Primary serving cell
PSCell Primary SCell
PUCCH Physical Uplink Control Channel
PUSCH Physical Uplink Shared Channel
RAT Radio Access Technology
RB Resource Block
RF Radio Frequency
RLM Radio Link Management
RNC Radio Network Controller
RRC Radio Resource Control
RRH Remote Radio Head
RRM Radio Resource Management
RRU Remote Radio Unit
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SCG Secondary Cell Group
SCH Synchronization Channel
SDU Service Data Unit
SeNB Secondary eNodeB
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
TTI Transmission Time Interval
Tx Transmitter
UE User Equipment
UL Uplink
URLLC Ultra-Reliable Low Latency Communication
UTRA Universal Terrestrial Radio Access
UTRAN Universal Terrestrial Radio Access Network
V2V Vehicle-to-vehicle
V2X Vehicle-to-everything
WLAN Wireless Local Area Network

The invention claimed is:

1. A method performed by a wireless device, the method comprising:
obtaining narrowband positioning reference signal (NPRS) configuration information indicating a system frame number (SFN) dependent resource mapping, wherein the SFN dependent resource mapping includes at least one modulus factor (K) including a first modulus factor associated with a number of resource blocks of a virtual reference bandwidth for generating the NPRS sequence and a downlink bandwidth;
obtaining a NPRS generated in accordance with the SFN dependent resource mapping; and
performing at least one radio measurement operation using the NPRS to estimate at least one signal characteristic.

2. The method of claim 1, wherein the NPRS configuration information indicates to use Type 2 NPRS for mapping to resource elements.

3. The method of claim 1, wherein obtaining the NPRS comprises receiving the NPRS from a network node.

4. The method of claim 1, wherein obtaining the NPRS comprises generating a NPRS sequence, and selecting modulation symbols from the generated NPRS sequence in accordance with the SFN dependent resource mapping.

5. The method of claim 1, wherein the SFN dependent resource mapping further includes a function of at least one of: a number of NPRS resource elements per resource block, a number of NPRS resource elements per symbol, a NPRS resource element density, a NPRS occasion length (Nnprs), and a NPRS periodicity (Tnprs).

6. The method of claim 1, wherein the at least one modulus factor (K) includes a second modulus factor associated with the SFN.

7. The method of claim 6, wherein the second modulus factor is varied as a function of the SFN.

8. The method of claim 1, further comprising, reporting the at least one signal characteristic to a network node.

9. The method of claim 1, further comprising, receiving a request for capability information associated with supporting NPRS generation with the SFN dependent resource mapping.

10. The method of claim 1, further comprising, transmitting capability information associated with supporting NPRS generation with the SFN dependent resource mapping.

11. A wireless device comprising a radio interface and processing circuitry configured to:
obtain narrowband positioning reference signal (NPRS) configuration information indicating a system frame number (SFN) dependent resource mapping, wherein the SFN dependent resource mapping includes at least one modulus factor (K) including a first modulus factor associated with a number of resource blocks of a virtual reference bandwidth for generating the NPRS sequence and a downlink bandwidth;
obtain a NPRS generated in accordance with the SFN dependent resource mapping; and
perform at least one radio measurement operation using the NPRS to estimate at least one signal characteristic.

12. The wireless device of claim 11, wherein the NPRS configuration information indicates to use Type 2 NPRS for mapping to resource elements.

13. The wireless device of claim 11, wherein obtaining the NPRS comprises receiving the NPRS from a network node.

14. The wireless device of claim 11, wherein obtaining the NPRS comprises generating a NPRS sequence, and selecting modulation symbols from the generated NPRS sequence in accordance with the SFN dependent resource mapping.

15. The wireless device of claim 11, wherein the SFN dependent resource mapping further includes a function of at least one of: a number of NPRS resource elements per resource block, a number of NPRS resource elements per symbol, a NPRS resource element density, a NPRS occasion length (Nnprs), and a NPRS periodicity (Tnprs).

16. The wireless device of claim 11, wherein the at least one modulus factor (K) includes a second modulus factor associated with the SFN.

17. The wireless device of claim 16, wherein the second modulus factor is varied as a function of the SFN.

18. The wireless device of claim 11, further configured to report the at least one signal characteristic to a network node.

19. The wireless device of claim 11, further configured to receive a request for capability information associated with supporting NPRS generation with the SFN dependent resource mapping.

20. The wireless device of claim 11, further configured to transmit capability information associated with supporting NPRS generation with the SFN dependent resource mapping.

21. A method performed by a network node, the method comprising:
transmitting narrowband positioning reference signal (NPRS) configuration information indicating a system frame number (SFN) dependent resource mapping, wherein the SFN dependent resource mapping includes at least one modulus factor (K) including a first modulus factor associated with a number of resource blocks of a virtual reference bandwidth for generating the NPRS sequence and a downlink bandwidth; and
obtaining at least one estimated signal characteristic associated with the transmitted NPRS configuration.

22. The method of claim 21, further comprising, providing a NPRS in accordance with the SFN dependent resource mapping.

23. The method of claim 22, wherein the NPRS is transmitted by a second network node.

24. The method of claim 22, wherein providing the NPRS comprises generating a NPRS sequence, and selecting modulation symbols from the generated NPRS sequence in accordance with the SFN dependent resource mapping.

25. The method of claim 21, wherein the NPRS configuration information indicates to use Type 2 NPRS for mapping to resource elements.

26. The method of claim 21, wherein the SFN dependent resource mapping further includes a function of at least one of: a number of NPRS resource elements per resource block, a number of NPRS resource elements per symbol, a NPRS resource element density, a NPRS occasion length (Nnprs), and a NPRS periodicity (Tnprs).

27. The method of claim 21, wherein the at least one modulus factor (K) includes a second modulus factor associated with the SFN.

28. A network node comprising a radio interface and processing circuitry configured to:
transmit narrowband positioning reference signal (NPRS) configuration information indicating a system frame number (SFN) dependent resource mapping, wherein the SFN dependent resource mapping includes at least one modulus factor (K) including a first modulus factor associated with a number of resource blocks of a virtual reference bandwidth for generating the NPRS sequence and a downlink bandwidth; and obtain at least one estimated signal characteristic associated with the transmitted NPRS configuration.

29. The network node of claim 28, further configured to provide a NPRS in accordance with the SFN dependent resource mapping.

30. The network node of claim 29, wherein the NPRS is transmitted by a second network node.

31. The network node of claim 29, wherein providing the NPRS comprises generating a NPRS sequence, and selecting modulation symbols from the generated NPRS sequence in accordance with the SFN dependent resource mapping.

32. The network node of claim 28, wherein the NPRS configuration information indicates to use Type 2 NPRS for mapping to resource elements.

33. The network node of claim 28, wherein the SFN dependent resource mapping further includes a function of at least one of: a number of NPRS resource elements per resource block, a number of NPRS resource elements per symbol, a NPRS resource element density, a NPRS occasion length (Nnprs), and a NPRS periodicity (Tnprs).

34. The network node of claim 28, wherein the at least one modulus factor (K) includes a second modulus factor associated with the SFN.

* * * * *